(12) United States Patent
Hibbets et al.

(10) Patent No.: US 8,356,048 B2
(45) Date of Patent: Jan. 15, 2013

(54) SYSTEMS AND METHODS FOR IMPROVED FORUMS

(75) Inventors: Jason S. Hibbets, Raleigh, NC (US); Norman Lee Faus, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 155 days.

(21) Appl. No.: 11/756,578

(22) Filed: May 31, 2007

(65) Prior Publication Data

US 2008/0301091 A1  Dec. 4, 2008

(51) Int. Cl.
  *G06F 17/30*  (2006.01)
(52) U.S. Cl. .................. 707/769; 707/E17.014
(58) Field of Classification Search .......... None
  See application file for complete search history.

(56) References Cited

U.S. PATENT DOCUMENTS

| | | | |
|---|---|---|---|
| 5,649,182 A | 7/1997 | Reitz | |
| 6,223,165 B1 | 4/2001 | Lauffer | |
| 6,345,257 B1 | 2/2002 | Jarrett | |
| 6,374,261 B1 | 4/2002 | Alvarez et al. | |
| 6,446,058 B1 | 9/2002 | Brown | |
| 6,477,667 B1 | 11/2002 | Levi et al. | |
| 6,493,702 B1 * | 12/2002 | Adar et al. | 707/3 |
| 6,519,629 B2 * | 2/2003 | Harvey et al. | 709/204 |
| 6,691,162 B1 | 2/2004 | Wick | |
| 6,735,592 B1 | 5/2004 | Neumann et al. | |
| 6,739,508 B2 | 5/2004 | Ushioda et al. | |
| 6,938,068 B1 | 8/2005 | Kraft et al. | |
| 6,988,126 B2 | 1/2006 | Wilcock et al. | |
| 7,007,235 B1 | 2/2006 | Hussein et al. | |
| 7,028,228 B1 | 4/2006 | Lovy et al. | |
| 7,069,480 B1 | 6/2006 | Lovy et al. | |
| 7,143,089 B2 * | 11/2006 | Petras et al. | 707/749 |
| 7,159,011 B1 * | 1/2007 | Knight et al. | 709/207 |
| 7,359,894 B1 * | 4/2008 | Liebman et al. | 707/3 |
| 7,382,247 B2 | 6/2008 | Welch et al. | |
| 7,437,382 B2 * | 10/2008 | Zhang et al. | 707/102 |
| 7,472,071 B2 | 12/2008 | Marks et al. | |
| 7,543,232 B2 | 6/2009 | Easton et al. | |
| 7,546,254 B2 | 6/2009 | Bednarek | |
| 7,548,914 B2 * | 6/2009 | Bell et al. | 1/1 |
| 7,558,828 B1 | 7/2009 | Panzer | |
| 7,600,160 B1 | 10/2009 | Lovy et al. | |
| 7,603,350 B1 * | 10/2009 | Guha | 1/1 |

(Continued)

FOREIGN PATENT DOCUMENTS

WO  99/39279  8/1999

(Continued)

OTHER PUBLICATIONS

Non-Final Office Action for U.S. Appl. No. 11/845,487 mailed May 14, 2010.

(Continued)

*Primary Examiner* — Fred I Ehichioya
*Assistant Examiner* — Michelle Owyang
(74) *Attorney, Agent, or Firm* — Lowenstein Sandler PC (57) ABSTRACT

An embodiment relates generally to a method of searching. The method includes receiving a query in a structured forum and searching a general and certified knowledgebase based on the query. The method also includes providing a plurality of search results ordered based on an associated rating of each search result of the plurality of the search results.

15 Claims, 7 Drawing Sheets

U.S. PATENT DOCUMENTS

| | | | |
|---|---|---|---|
| 7,613,690 B2 | 11/2009 | Chowdhury et al. | |
| 7,617,127 B2 | 11/2009 | Hunt et al. | |
| 7,664,747 B2* | 2/2010 | Petras et al. | 707/805 |
| 7,668,838 B2* | 2/2010 | Baio et al. | 719/328 |
| 7,698,242 B2 | 4/2010 | Van Camp et al. | |
| 7,752,314 B2* | 7/2010 | Trevor et al. | 709/226 |
| 7,788,322 B2* | 8/2010 | Busey | 709/203 |
| 7,925,788 B2 | 4/2011 | Hibbets | |
| 2001/0032244 A1 | 10/2001 | Neustel | |
| 2001/0037317 A1* | 11/2001 | Freiwirth et al. | 705/74 |
| 2002/0049738 A1 | 4/2002 | Epstein | |
| 2002/0055935 A1 | 5/2002 | Rosenblum | |
| 2002/0087520 A1 | 7/2002 | Meyers | |
| 2002/0123983 A1 | 9/2002 | Riley et al. | |
| 2002/0169783 A1 | 11/2002 | Kreulen et al. | |
| 2002/0174106 A1 | 11/2002 | Martin | |
| 2002/0194164 A1 | 12/2002 | Morrow et al. | |
| 2003/0028525 A1* | 2/2003 | Santos et al. | 707/3 |
| 2003/0033302 A1* | 2/2003 | Banerjee et al. | 707/6 |
| 2003/0101083 A1 | 5/2003 | Venkatesh et al. | |
| 2003/0144895 A1 | 7/2003 | Aksu et al. | |
| 2003/0196094 A1 | 10/2003 | Hillis et al. | |
| 2003/0221123 A1 | 11/2003 | Beavers | |
| 2004/0054520 A1 | 3/2004 | Dehlinger et al. | |
| 2004/0107125 A1 | 6/2004 | Guheen et al. | |
| 2004/0199573 A1 | 10/2004 | Schwartz et al. | |
| 2005/0120011 A1 | 6/2005 | Dehlinger et al. | |
| 2005/0138115 A1 | 6/2005 | Llamas et al. | |
| 2005/0144151 A1 | 6/2005 | Fischman et al. | |
| 2005/0256866 A1* | 11/2005 | Lu et al. | 707/5 |
| 2006/0004601 A1 | 1/2006 | Marks | |
| 2006/0013367 A1 | 1/2006 | Sawyer et al. | |
| 2006/0064486 A1 | 3/2006 | Baron et al. | |
| 2006/0106788 A1* | 5/2006 | Forrest | 707/4 |
| 2006/0122992 A1 | 6/2006 | Bellaiche et al. | |
| 2006/0136869 A1 | 6/2006 | Lamm et al. | |
| 2006/0161524 A1* | 7/2006 | Roy et al. | 707/3 |
| 2006/0167846 A1 | 7/2006 | Nevin et al. | |
| 2006/0200356 A1 | 9/2006 | Wan | |
| 2006/0252547 A1 | 11/2006 | Mizrahi et al. | |
| 2006/0271545 A1 | 11/2006 | Youn et al. | |
| 2006/0277091 A1* | 12/2006 | Kochikar et al. | 705/10 |
| 2006/0282304 A1* | 12/2006 | Bedard et al. | 705/10 |
| 2006/0288087 A1 | 12/2006 | Sun | |
| 2007/0094228 A1 | 4/2007 | Nevin et al. | |
| 2007/0106659 A1* | 5/2007 | Lu et al. | 707/5 |
| 2007/0174247 A1* | 7/2007 | Xu et al. | 707/3 |
| 2007/0174254 A1 | 7/2007 | Toong et al. | |
| 2007/0179835 A1* | 8/2007 | Ott et al. | 705/10 |
| 2007/0198319 A1* | 8/2007 | Sciuk | 705/8 |
| 2007/0198510 A1 | 8/2007 | Ebanks | |
| 2007/0219995 A1 | 9/2007 | Heumann et al. | |
| 2007/0260587 A1 | 11/2007 | Mohan | |
| 2007/0274495 A1 | 11/2007 | Youd et al. | |
| 2007/0282781 A1 | 12/2007 | Mathiesen et al. | |
| 2007/0288292 A1 | 12/2007 | Gauger | |
| 2008/0021884 A1 | 1/2008 | Jones et al. | |
| 2008/0046394 A1* | 2/2008 | Zhou et al. | 706/52 |
| 2008/0059447 A1 | 3/2008 | Winner et al. | |
| 2008/0071819 A1* | 3/2008 | Monsarrat | 707/102 |
| 2008/0082486 A1* | 4/2008 | Lermant et al. | 707/3 |
| 2008/0082607 A1* | 4/2008 | Sastry et al. | 709/204 |
| 2008/0086471 A1* | 4/2008 | Ritter et al. | 707/8 |
| 2008/0091686 A1 | 4/2008 | Beard | |
| 2008/0098109 A1 | 4/2008 | Faihe et al. | |
| 2008/0147741 A1 | 6/2008 | Gonen et al. | |
| 2008/0147863 A1 | 6/2008 | Evanchik et al. | |
| 2008/0162376 A1 | 7/2008 | Roulston | |
| 2008/0201321 A1 | 8/2008 | Fitzpatrick et al. | |
| 2008/0228504 A1 | 9/2008 | Nguyen et al. | |
| 2008/0281769 A1 | 11/2008 | Hibbets | |
| 2008/0301115 A1 | 12/2008 | Mattox et al. | |
| 2008/0301674 A1 | 12/2008 | Faus | |
| 2008/0306932 A1 | 12/2008 | Faus et al. | |
| 2009/0063386 A1 | 3/2009 | Hibbets | |
| 2009/0187626 A1 | 7/2009 | Degaugue | |

FOREIGN PATENT DOCUMENTS

| | | |
|---|---|---|
| WO | 01/35272 A2 | 5/2001 |
| WO | 01/53970 A2 | 7/2001 |

OTHER PUBLICATIONS

Final Office Action for U.S. Appl. No. 11/845,487 mailed Jan. 3, 2011.
Advisory Action for U.S. Appl. No. 11/845,487 mailed Mar. 16, 2011.
Notice of Allowance for U.S. Appl. No. 11/845,487 mailed Jun. 13, 2011.
Notice of Allowance for U.S. Appl. No. 11/845,487 mailed Aug. 9, 2011.
Non-Final Office Action for U.S. Appl. No. 11/747,220 mailed Jun. 22, 2009.
Notice of Allowance for U.S. Appl. No. 11/747,220 mailed May 3, 2010.
Notice of Allowance for U.S. Appl. No. 11/747,220 mailed Oct. 1, 2010.
Notice of Allowance for U.S. Appl. No. 11/747,220 mailed Nov. 30, 2010.
Notice of Allowance for U.S. Appl. No. 11/747,220 mailed Feb. 2, 2011.
Non-Final Office Action for U.S. Appl. No. 11/759,785 mailed May 19, 2009.
Final Office Action for U.S. Appl. No. 11/759,785 mailed Dec. 15, 2009.
Non-Final Office Action for U.S. Appl. No. 11/759,785 mailed Jul. 20, 2010.
Advisory Action for U.S. Appl. No. 11/759,785 mailed Apr. 13, 2010.
Non-Final Office Action for U.S. Appl. No. 11/756,334 mailed May 13, 2009.
Final Office Action for U.S. Appl. No. 11/756,334 mailed Nov. 23, 2009.
Non-Final Office Action for U.S. Appl. No. 11/756,334 mailed May 13, 2010.
Final Office Action for U.S. Appl. No. 11/756,334 mailed Oct. 13, 2010.
Non-Final Office Action for U.S. Appl. No. 11/756,334 mailed Feb. 8, 2011.
Final Office Action for U.S. Appl. No. 11/756,334 mailed Jul. 20, 2011.
Advisory Action for U.S. Appl. No. 11/756,334 mailed Feb. 1, 2010.
Notice of Allowance for U.S. Appl. No. 11/756,334 mailed Feb. 8, 2012.

* cited by examiner

SYSTEMS AND METHODS FOR IMPROVED FORUMS

FIELD

This invention relates generally to forums, more particularly, to systems and methods for improved forums.

DESCRIPTION OF THE RELATED ART

A forum can be regarded as essentially a website composed of a number of member-written threads. Each thread entails a discussion or conversation in the form of a series of user-member written posts. These threads remain saved on the forum website for future reading indefinitely or until deletion by a moderator.

Software packages that implement forum websites are generally well known. These software packages are widely available on the Internet in a variety of programming languages such as HypeterText Preprocess ("PHP"), Perl, Java, and active server pages ("ASP"). The configuration and records of posts can be stored in text files or in a database.

Although forums are an effective tool to exchange information, they are not without drawbacks and disadvantages. For example, a user trying to obtain information on a particular issue may find it very difficult to locate a definite answer on the issue. The answer may reside in different parts of different threads. If user is fortunate, another user may recall a similar thread regarding the same issue and forward the thread to the user. Accordingly, there is a need to effectively organize the information in forums for easy access and verification.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to a system and method for improving Internet forums. More particularly, a structured forum can be configured to provide a mechanism for user to ask questions from a community based knowledgebase (or certified knowledgebase) as well as a general knowledgebase. The structured forum provides for a rating system to evaluate answers provided by other users and for users to search the knowledgebase with tagging for both the community based and general knowledgebases. The rating system allows the user community to rate the quality of the answers. If an answer is rated highly enough by the user community, the answer can be placed into the certified knowledgebase. The tagging of the answer provides a mechanism for the user to easily find and classify previous verified or certified answers within the community based and general knowledgebases.

For other unverified answers, the community based knowledgebase contains previous answers that haven't been verified or haven't been rated highly enough to enter the general knowledgebase. In some embodiments, the unverified answers can also be tagged for searching. Accordingly, a user can enter the structured forum and search for validated answers that have been community verified, i.e., certified, as well as unverified answers.

Figure 1:
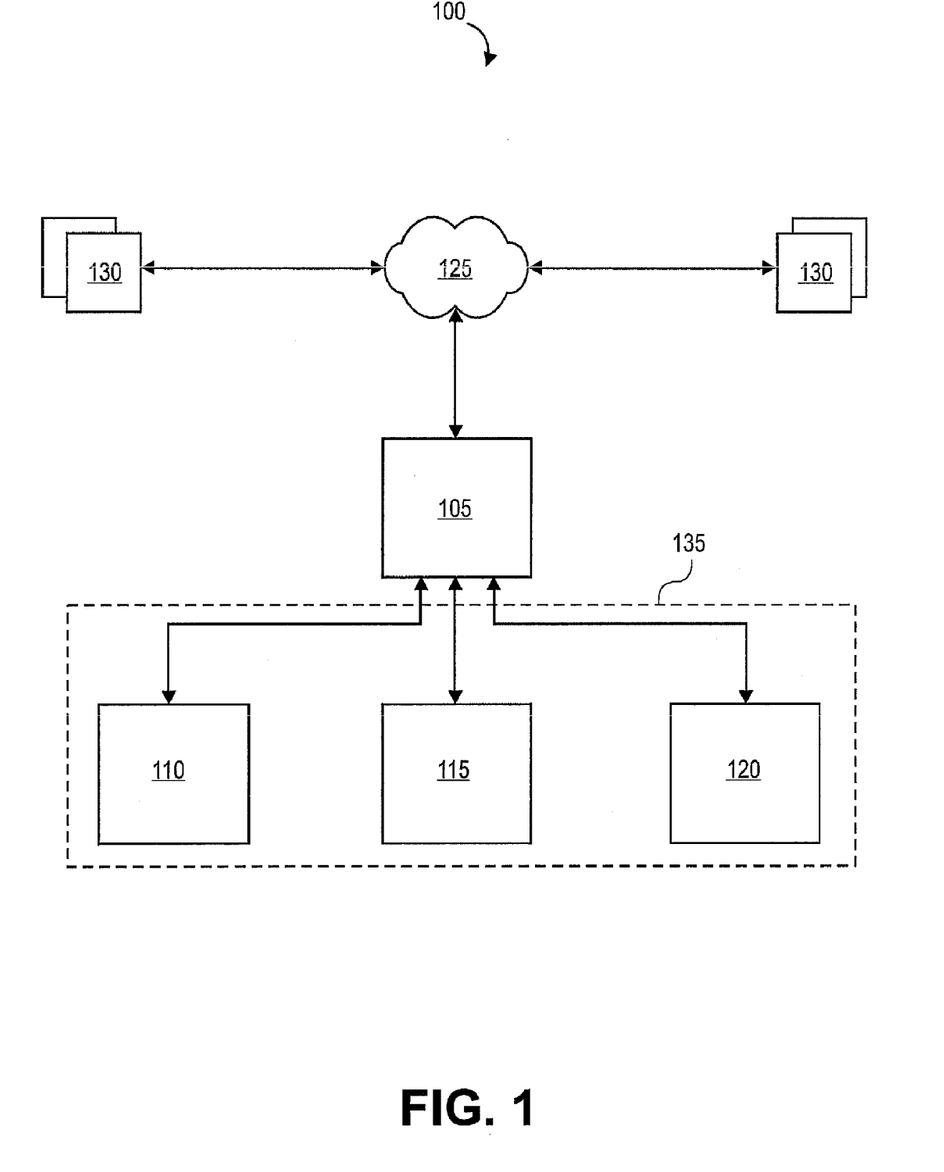
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a service portal 105 coupled to a network 125. Users 130 can interface with the service portal 105 through the network 125. The network 125 can be a combination of local area networks, wide area networks, public networks, and private networks or combinations thereof such as the Internet.

The users 130 can be interface with the service portal 105 using computing platforms such as personal computers, workstations, private local area networks (e.g., business entity or government entity) or other similar device that can provide network access and interact with the service portal 105.

In some embodiments, the service portal 105 can be configured to provide services. As a non-limiting example, the service portal 105 can be configured to provide information for users to research, compare and purchase software, hardware and consulting services in support of the those software and/or hardware purchases. The service portal 105 can also be configured to provide support services by subscription to those same software and/or hardware purchases. The service portal 105 can further be configured to provide a knowledgebase for a user in a community can search for answers regarding issues. The community can comprise of registered and non-registered users.

The service portal 105 can be configured to provide at least the described services with a service backend 130. The service backend 130 can comprise at least a knowledge server 110, an issue tracker server 115 and a chat server 120.

The knowledge server 110 can be configured to provide a knowledgebase for the system 100. The knowledgebase can comprise of Wiki pages, articles, frequently asked questions, transcripts of chat sessions, forums, and other informational items related to issues deemed worth discussing by the community. The knowledge server 110 can also be configured to search and retrieve requested informational items from third party sites such as Google®, Yahoo™, etc. The knowledge server 110 can then rank and prioritize the search results from internal and external sources for the requesting user based on a single interface provided by the server portal 105. In some embodiments, the knowledge server 110 can be implemented on a separate server using open-source technologies.

The service portal 105 can also be configured to interface with the issue tracker server 115, which provide support services for the service portal 105. More particularly, a user may have a problem or issue with a purchased software and/or hardware from the service portal 105. The user can return to the service portal 105 and request support services based on a purchased service subscription through a user interface generated by the service portal 105. The service portal 105 can redirect the support request to the issue tracker server 115. The issue tracker server 115 can open an associated service ticket for resolution by support personnel. The issue tracker server 115 can also be configured to attach transcripts of any chat sessions between the support personnel and the user as well as documenting the solution(s) to the issue of the user. In some aspects, the documented solution can be converted into an article, added to a frequently asked question list, Wiki page, etc., and passed onto the knowledge server 110.

The chat server 120 can be configured to couple with the service portal 105. A user with an issue or question can log into the service portal 105 and search for solutions and/or answers. The service portal 105 can generate a user interface and display an option for requesting assistance via a chat session. If a user selects this option, the service portal 105 can pass the request over to the chat server 120. The chat server 120 can be configured to provide the chat session to the user via another user interface provided by the service portal 105. The chat server 120 can also be configured to save the chat sessions for later review. For example, support personnel can turn the chat session into an article or extract discussed solutions in the chat sessions into or add to a frequently asked questions list.

Figure 2:
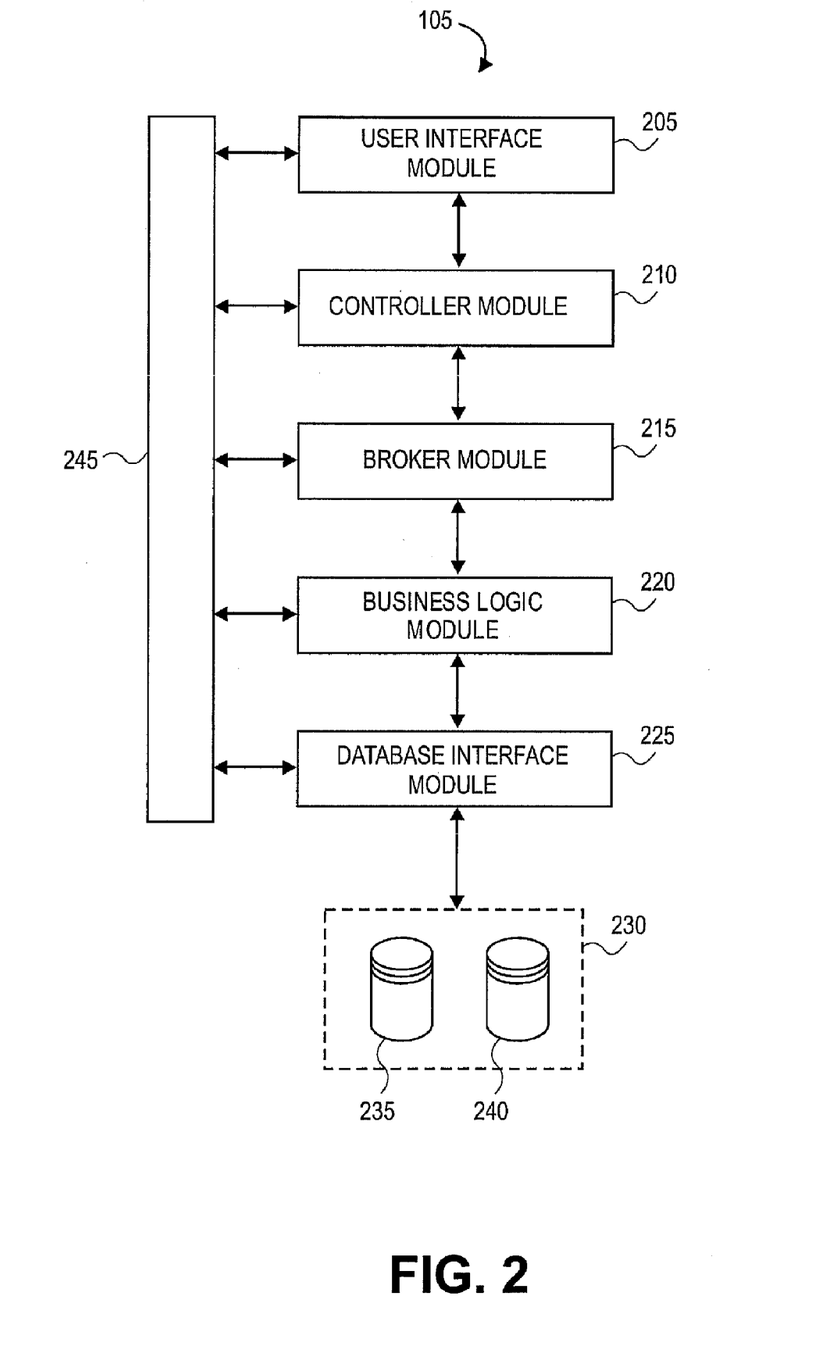
FIG. 2 illustrates an exemplary service portal of the system shown in FIG. 1 in accordance with another embodiment.

FIG. 2 illustrates a more detailed block diagram of the service portal 105 in accordance with another embodiment. It should be readily apparent to those of ordinary skill in the art that the service portal 105 depicted in FIG. 2 represents a generalized schematic illustration and that other components may be added or existing components may be removed or modified.

As shown in FIG. 2, the service portal 105 can comprise a user interface module 205, a controller module 210, a broker module 215, a business logic module 220, a database interface module 225, and a logging module 245. The user interface module 205 can be configured to generate the graphical user interfaces ("GUIs") for users to interact with service portal 105. The user interface module 205 can generate the necessary functionality of the GUIs based on hypertext markup language ("HTML") code, cascading style sheets ("CSS") and/or Java Server Pages ("JSP").

The user interface module 205 can be configured with a controller module 210, which is configured to provide code support for the functionality embedded in the GUIs of the user interface module 205. More particularly, the controller module 210 can comprise DWR, Dojo, and a library of JavaScript apps. The controller module 210 can be implemented using direct web remoting (DWR). DWR can be considered a Java and JavaScript open source library which allows a programmer to write Asynchronous JavaScript and XML ("Ajax") web applications or interactive web applications. DWR allows generally JavaScript code in the GUI generated by the user interface module 205 to use Java methods.

The Dojo component can be considered an open-source JavaScript Toolkit to construct the dynamic web user interfaces. As such, the controller module 210 can dynamically generate user interfaces to pass along to the user interface module 205 for display to a user.

The library of JavaScript apps can define a list of predetermined functionality that users are likely to call. For example, one JavaScript can be "Get Price of Product X".

The controller module 210 can also be coupled with the broker module 215. The broker module 215 can be configured to provide a high-level business logic for the service portal 105. More particularly, the business logic can generally filter and direct an incoming request to the appropriate server of the service backend 130. For example, the broker module 215 can receive a request for delivery terms on a selected piece of hardware. The broker module 215 can identify the server that can satisfy the request, e.g., service portal 105, and forward the request to the selected server. Similarly, a request for technical support can be identified by the broker module 215 and be forwarded to the issue tracker server 215 to be serviced.

The broker module 215 can also be coupled with business logic 220, which is configured to contain the logic to provide the desired business services from the broker module 215 such as processing requests for the database 230. The business logic module 225 can also provide a schema for inquiries to the databases 230. The databases 230 can, abstractly, contain two databases: a user profile database 235 and a product catalog 240. The databases 230 can be implemented using any type of database systems provided by vendors such as MySQL, Oracle, Sybase, International Business Machines, etc. The business logic module 220 can provide the schema to formulate queries to pass to the databases 230 through the database interface module 225. The business logic module 220 can be implemented using an open source lightweight framework such as Spring Application Framework supported by data access objects, beans, and manager.

The database interface module 225 can be configured to provide an abstraction between the databases 230 and the business logic module 220. The database interface module 225 can be implemented with Hibernate or other similar abstractions. The database interface module 225 provides object relational mapping and persistence management with the databases 230.

The modules 205-225 of the service portal 105 can also be implemented using an open source servlet container and web-server such as Tomcat™ in some embodiments. Other embodiments could use proprietary servlet container and webserver technologies.

The logging module 245 can be configured to couple with the user interface module 205, the controller module 210, the broker module 215, the business logic module 220 and the database interface module 225. The logging module 245 can also be configured to provide logging and exception handling for all the coupled modules 205-225. The aforementioned module can provide functions which may be commonly called by the rest of modules 205-225 of the service portal 105. The logging module 245 can be implemented using aspect-oriented programming as known to those skilled in the art.

Figure 3:
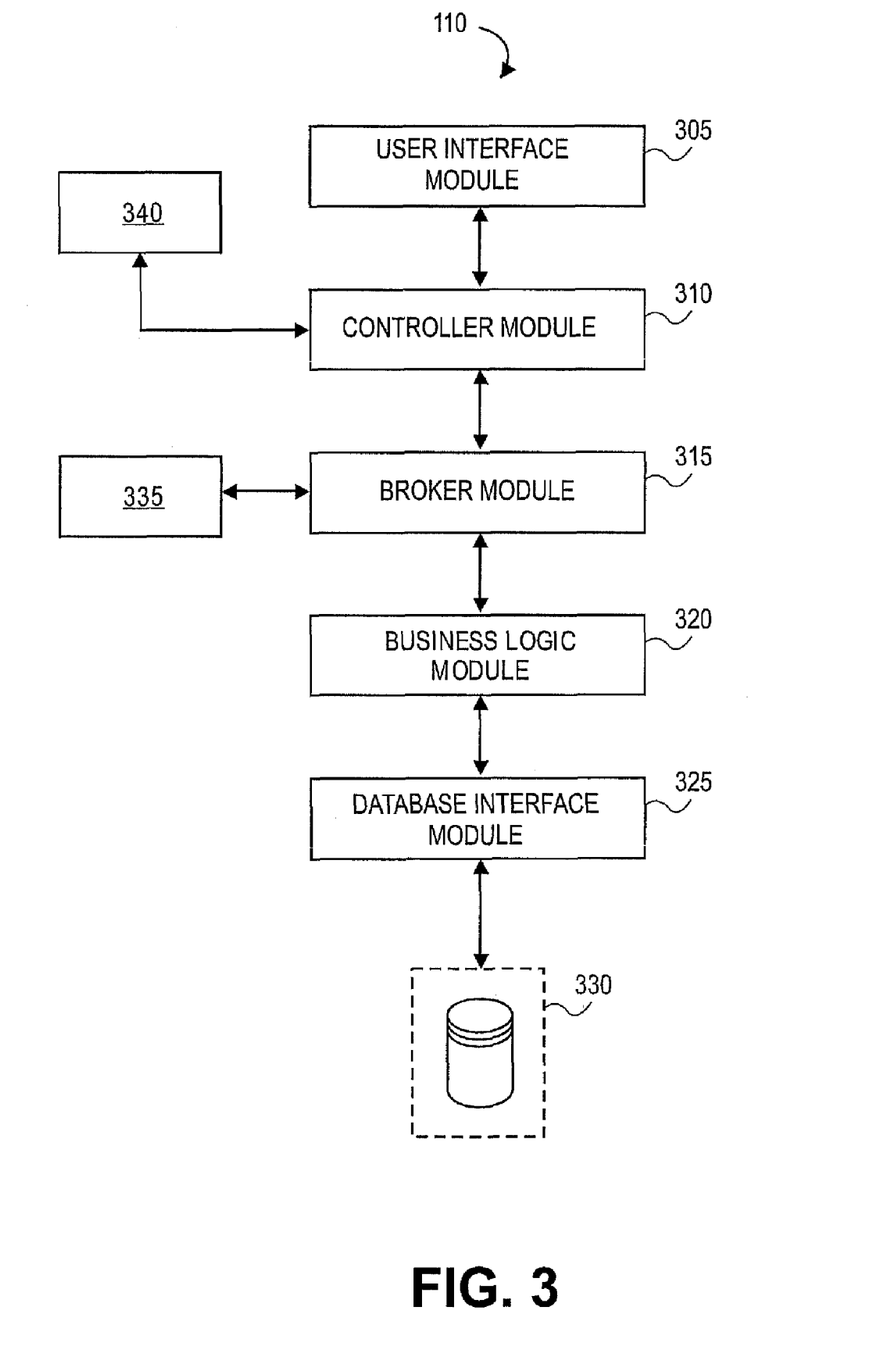
FIG. 3 depicts an exemplary knowledge server of the system shown in FIG. 1 in accordance with yet another embodiment.

FIG. 3 illustrates a more detailed block diagram of the knowledge server 110 in accordance with another embodiment. It should be readily apparent to those of ordinary skill in the art that the knowledge server 110 depicted in FIG. 3 represents a generalized schematic illustration and that other components may be added or existing components may be removed or modified.

FIG. 2 and FIG. 3 share some common components. As such, the description of the common components is being omitted and the description of these components with respect to the FIG. 2 is being relied upon to provide adequate description of the common components.

As shown in FIG. 3, the knowledge server 110 can comprise at least a user interface module 305, a controller module 310, a broker module 315, a business logic module 320 and a database interface module 325.

Similar to the service portal 105, the user interface module 305 of the knowledge server 110 can be configured to provide the GUIs for users to interact with the knowledge server 110. The functionality for selected actions by the users is provided by the controller module 310. The controller module 310 can be configured to provide the associated code for the requested functionality of the selected action in the GUI. The broker module 315 can be configured to provide high-level business logic for the knowledge server 110. More particularly, the broker module 315 can provide filtering for the requests entering the knowledge server 110. For these requests, the broker module 315 can receive these requests from the service portal 105 through the server interface 335. The server interface 330 can be implemented using simple object access protocols, web services, etc. The knowledge server 110 can also user the server interface 335 to return requested information to the service portal 105. Unlike the service portal 105, the knowledge server 110 can be configured to prevent direct access to the knowledge server 110 but can only be accessed through the service portal 105.

The broker module 315 of the knowledge server 110 can also be coupled to the business logic module 320, which is configured to contain the logic to provide the desired business services as received from the broker module 315 such as processing requests for the database 330. The business logic module 325 can also provide a schema for queries into the knowledgebase database 330. The database interface module 325 can be configured to provide a level of abstraction between the queries from the broker module 320 to the actual physical implementation of the knowledgebase database 330. As previously described, the knowledgebase database 330 can be implemented with database architectures provided by vendors such as MySQL, Oracle, Sybase, International Business Machines, and other similar manufacturers.

The modules 305-325 of the service portal 105 can also be implemented using be implemented using an open source servlet container and webserver such as Tomcat™ in some embodiments. Other embodiments could use proprietary servlet container and webserver technologies.

Figure 4:
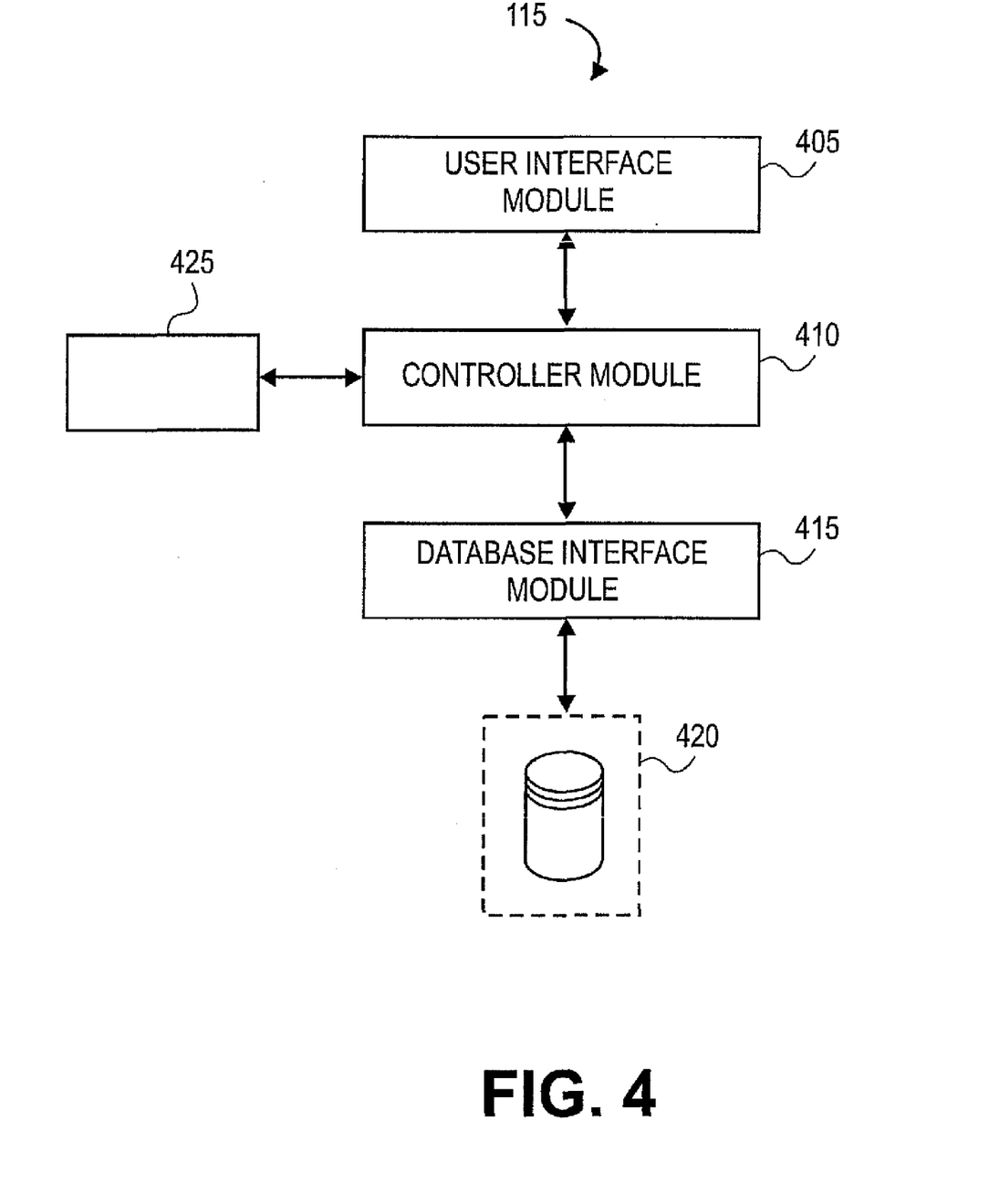
FIG. 4 illustrates an exemplary issue tracker server of the system shown in FIG. 1 in accordance with yet another embodiment.

FIG. 4 illustrates a more detailed block diagram of the issue tracker server 115 in accordance with another embodiment. It should be readily apparent to those of ordinary skill in the art that the issue tracker server 115 depicted in FIG. 4 represents a generalized schematic illustration and that other components may be added or existing components may be removed or modified.

As shown in FIG. 4, the issue tracker server 115 can comprise a user interface module 405, a controller module 410, a database 415, and a server interface 425. Similar to the service portal 105 and the knowledge server 110, the user interface module 405 of the issue tracker server 115 can be configured to generate GUIs for the service portal 105 to interface thereto. As with the knowledge server 110, the service portal 105 provides a unified interface to the issue tracker server 115. The service portal 105 can be configured to receive requests from users to access the issue tracker server 115. The received requests are processed by the issue tracker server 115 and any information is returned using the issue tracker server's GUIs as generated by the user interface module 405. The service portal 105 reformats any returning information from the issue tracker server 115 and the other servers in a unified GUI generated by the user interface module 105 of the service portal 105. Accordingly, a user can be presented with information from the servers 110-120 in a consistent format.

The user interface module 405 can be implemented using HTML code, CSS sheets, Hypertext Pre-Processor ("PHP") code and/or Resources of a Resource (ROR) code. The controller module 410 can provide the associated code for the functionality provided by the GUIs generated by the user interface module 405.

The controller module 410 can be configured to communicate with the other servers (205, 210, and/or 220) through a communication interface 415. The communication interface 415 can use SOAP or web service protocols over the Internet to provide the communication conduit.

The controller module 410 can also be configured to interface with the database 420. The database 420 can be configured to store the open and closed service tickets. The database 420 can also be configured to store links to or the actual articles, chats session used to resolve the issue. In some embodiments, the database 420 can be implemented using MySQL 5.x database or other open source database. Other embodiments, the database 420 can be implemented using proprietary databases such as Oracle, Sybase, IBM, etc.

Although FIG. 4 depicts the user interface module 505, controller module 510, and the database interface module 515 as separate components, these modules 505-515 can be implemented using LAMP, which is an open source Web development platform based on Linux, Apache, MySQL, and PHP.

Figure 5:
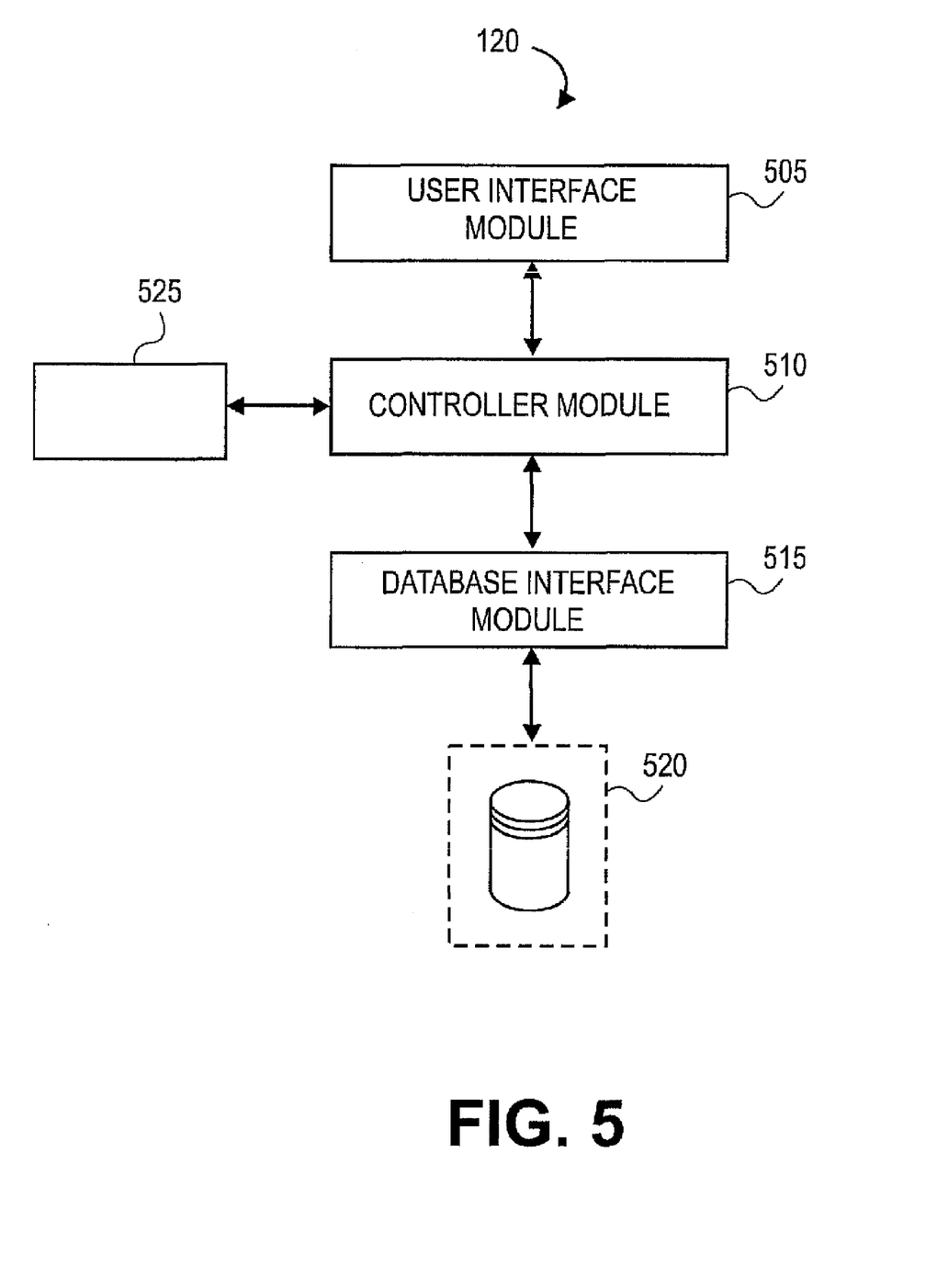
FIG. 5 depicts an exemplary chat server of the system shown in FIG. 1 in accordance with yet another embodiment.

FIG. 5 illustrates a more detailed block diagram of the chat server 120 in accordance with another embodiment. It should be readily apparent to those of ordinary skill in the art that the chat server 120 depicted in FIG. 5 represents a generalized schematic illustration and that other components may be added or existing components may be removed or modified.

The chat server 120 can be configured to provide chat services for users. The chat server 120 can provide a communication link between users and a group of support personnel. The users can request access to support through a GUI of the service portal 105. Some embodiments can use Wildfire to provide group and instant messaging service using the Extensible Messaging and Presence Protocol ("XMPP").

As shown in FIG. 5, the chat server 120 can comprise a user interface module 505, a controller module 210, a database interface module 215 and a database 220. The user interface module 505 of the chat server 120 can be configured to generate GUIs for the service portal 105 to interface thereto. The user interface module 505 can be implemented using HTML code, CSS, and/or Java Server pages.

As with the knowledge server 110 and the issue tracker server 115, the service portal 105 provides a unified interface to the chat server 120. The service portal 105 can be configured to receive requests from users to access the chat server 115. The received requests are processed by the chat server 120 to start a chat session with someone from a group of technical support personnel.

The received requests for chats can be processed by the controller module 510, which contains the associated code for the selected function in the GUI by a user. The controller module 510, in some embodiments, can be implemented using DWR.

The controller module 510 can also interface with a database interface module 515. The database interface module 515 can be configured to translate queries from the controller module 510 to appropriate format of the database 520 to store and retrieve information. The information stored in the database 520 can comprise of chat sessions between users and support personnel. In some embodiments, the database 520 can be implemented with a MySQL database. Returning to the database interface module 515, this module 515 can be implemented using plain old Java objects as known to those skilled in the art.

Although FIG. 5 depicts the user interface module 505, controller module 510, and the database interface module 515 as separate components, other embodiments can implement the functionality of these modules can be implemented using Tomcat Servlet container and web server from Apache Software Foundation.

Returning to FIG. 3, the knowledge server 110 can be configured with a forum module 340 embedded in the controller module 510. The forum module 340 can be configured to provide a structured forum. The structure forum can provide a mechanism for users to ask questions from a community based (or certified) knowledgebase as well as a general knowledgebase. The structured forum provides for a rating system to evaluate answers provided by other users and for users to search the knowledgebase with tagging for both the community based and general knowledgebases. The rating system allows the user community to rate the quality of the answers. If an answer is rated highly enough by the user community, the answer can be placed into the certified knowledgebase. The tagging of the answer provides a mechanism for the user to easily find and classify previous verified or certified answers within the community based and general knowledgebases.

For other unverified answers, the general knowledgebase contains previous answers that haven't been verified or haven't been rated highly enough to enter the certified knowledgebase. In some embodiments, the unverified answers can also be tagged for searching. Accordingly, a user can enter the structured forum and search for validated answers that have been certified or community verified as well as view unverified answers.

Figure 6:
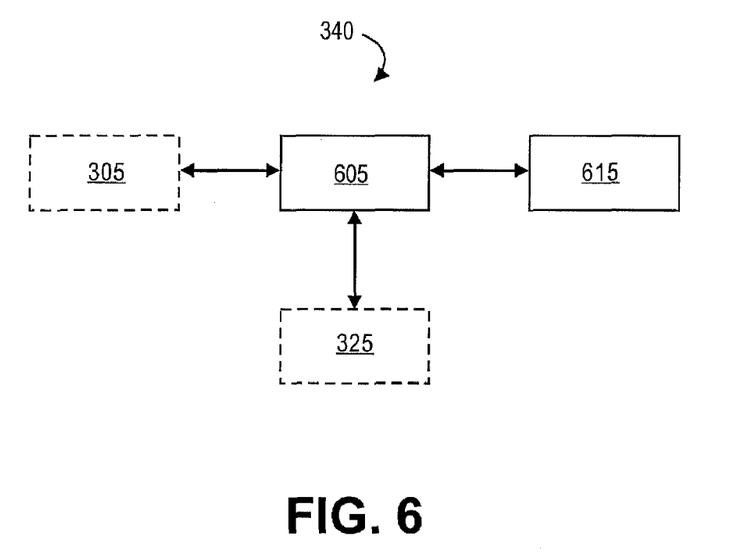
FIG. 6 illustrates an exemplary diagram of the forum module in accordance with yet another embodiment.

FIG. 6 illustrates a block diagram of the forum module 340 in accordance with yet another embodiment. It should be readily apparent to those of ordinary skill in the art that the forum module 340 depicted in FIG. 6 represents a generalized schematic illustration and that other components may be added or existing components may be removed or modified.

As depicted in FIG. 6, the forum module 340 comprises of a manager module 605 coupled to the user interface module 305, the database interface module 325, and a rating module 615. The manager module 605 is configured to implement the functionality of the forum module 340 as previously described and described in greater detail below with respect to FIGS. 7-9. The manager module 605 can be implemented in software code (Java, C, C++, etc.), hardware device (application specific integrated circuit, field programmable gate array, microprocessor, etc.) or combination thereof.

Although manager module 605 is depicted as a separate module in FIG. 3, it is readily obvious to those of ordinary skill in the art that the functionality of the manager module 605 can be implemented within the controller module 310 or the broker module 315 without departing from the teachings of the described embodiments.

The manager module 605 can access the user interface module 305 through the existing controller module 310 interfaces with the user interface module 305 as previously described. The user interface module 305 can be configured to generate GUIs to allow a user to search for information, review responses/answers to posts in the structured forums, and allow users to evaluate the responses/answers.

The manager module 605 can be configured to access the database 330 through the existing pathways between the controller module 310 and the database interface module 325. Accordingly, the manager module 605 can issue requests to the database 330 to search and retrieve items from the database 330.

In some embodiments, the database 330 can include, among other things, a general (or unverified) knowledgebase 345 and a certified knowledgebase 350. The knowledgebase 345 can be configured to store the threads, responses/answers, and the associated metadata of the stored data. The associated metadata can include, among other things, tags, rating information, and/or review data.

The certified knowledgebase 350 can be configured to also store threads, responses/answers and the associated metadata. However, the information stored in the certified knowledgebase 350 has been verified. More particularly, the information has been reviewed and rated high enough by a variety of users to exceed a predetermined threshold. Once this predetermined threshold is crossed, an information item can be placed within the certified knowledgebase 350.

Periodically or by command of a site administrator, the manager module 605 can be configured to review the metadata associated with items in the knowledgebase 345. If the rating of a selected item crosses the predetermined threshold (based level of rating, number of reviews, etc.), the manager module 605 can be configured to flag the selected item and move over to the certified knowledgebase 350.

In some embodiments, the information from the certified knowledgebase 350 is preferentially displayed and/or highlighted than the information from the knowledgebase 345 for a given query. For example, a result list would order items from the certified knowledgebase 350 higher than items from the knowledgebase 345. Accordingly, a subsequent user can be assured that the requested information is valid and updated without shifting through the chaff of irrelevant information.

The ratings module 610 can be configured to provide a mechanism for a user to review, evaluate the utility of the information item, and store the rating. More particularly, the manager module 605 can invoke the rating module 610 to display a GUI such as an overlay or a web-page to query the user regarding the information item. The rating module 610 can be configured to receive information from user input a designation (numerical or alphabetical) representing a factor of factor. The utility factor can be based on a variety of factors such as accuracy of the information, presentation, style, etc. The ratings module 610 can also receive a review of the article as written by the reviewer of the information item. The ratings module 610 can store this information in the database 330 and provide a link to the stored information where the link is associated (e.g., stored with the metadata) with the information item.

Figure 7:
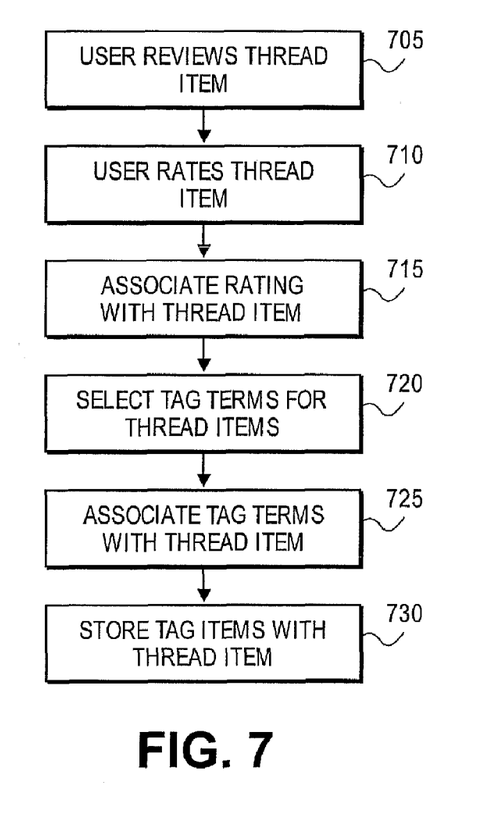
FIG. 7 depicts an exemplary flow diagram implemented by the forum module in accordance with yet another embodiment.

FIG. 7 illustrates a flow diagram 700 implemented by the forum module 340. It should be readily apparent to those of ordinary skill in the art that the flow diagram 700 depicted in FIG. 7 represents a generalized schematic illustration and that other steps may be added or existing steps may be removed or modified.

As shown in FIG. 7, a user can review an information item, in step 705. More particularly, the user may have accessed the service portal 105 through their local computer via a web browser such as Opera, Mozilla, Internet Explorer, or other similar web browser applications. The service portal 105 can present a GUI for the user to search for items in the database 330 of the knowledge server 110. The service portal 105 can be configured to process the request for the selected query to the controller module 215 of the service portal 105 and forward the request to the knowledge server 110 through the server interface 335. The knowledge server 110 can be configured to process the request through the broker module 315 of the knowledge server 315, which passes the request through the business logic module 320 and database interface module 325. The items matching the request are returned from the database 330 and possibly other third-party source can then be returned to the service portal 105.

In step 710, the user can rate the reviewed knowledge item, i.e., the thread item, with a numerical and/or alphabetical designation representing the rating of the thread item by entering the designation on a displayed GUI. When the user completes the rating, the user can click a graphical icon which then associates the designation or rating with the thread item, in step 715. The rating given by the user can be associated with the thread item by placing a link to the rating or including the rating within the metadata of the thread item. In some embodiments, a review written by the user may also be included in the link. In other embodiments, the rating module 610 of the forum module 340 can be configured to maintain the number of ratings and the level of the ratings for each selected item and arrive at a ranking. The ranking of the thread item is also linked or included with the thread item, which is stored in the knowledgebase 345

In some embodiments, the forum module 340 can direct a second GUI to be displayed for the user to associate any tag terms with the thread item, in step 720. More particularly, the second GUI can have a entry box to enter at least one term from the set of community tag terms 615 that the user would like to associate with the thread item.

When the user completes the list of associated tag terms, the user can submit the list of associated tag terms to the forum module 340 by activating an appropriate GUI widget to transfer the information as known to those skilled in the art and to associate the list with the thread item, in step 725. The forum module 340 can be configured to store the list of the associated tag terms in the metadata of thread item or place a link to the list in the metadata of the thread item, in step 730.

Figure 8:
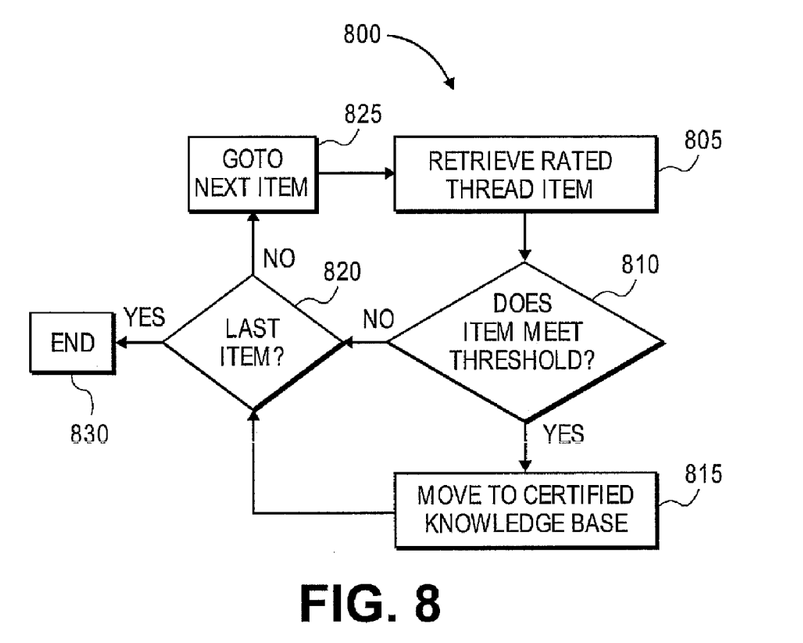
FIG. 8 illustrates another exemplary flow diagram implemented by the forum module in accordance with yet another embodiment.

FIG. 8 illustrates a flow diagram 800 implemented by the forum module 340 in accordance with yet another embodiment. It should be readily apparent to those of ordinary skill in the art that the flow diagram 800 depicted in FIG. 8 represents a generalized schematic illustration and that other steps may be added or existing steps may be removed or modified.

As shown in FIG. 8, the manager module 605 of the forum module 340 can be configured to retrieve a thread item from the knowledgebase 345, in step 805. More particularly, the manager module 605 can be invoked periodically or by command by a system administrator to implement this flow diagram. The manager module 605 can be configured to retrieve the ranking of the retrieved thread item and compare the ranking with the predetermined threshold. More particularly, the manager module 605 can retrieve the ranking from the metadata associated with the thread item either directly or by linked. If the ranking of the thread item exceeds the predetermined threshold, in step 810, the manager module 605 can be configured to move the selected thread item to the certified knowledgebase 350, in step 815 and subsequently go to the processing of step 820.

Otherwise, if the ranking of the thread item does not exceed the predetermined threshold, in step 810, the manager module 605 can be configured to determine whether the selected thread item is the last item in the knowledgebase 345, in step 820. If the selected thread item is not the last item, the manager module 605 can be configured to go to the next thread item, in step 825. Subsequently, the manager module 605 can return to the processing of step 805. Otherwise, if the selected thread item is the last item in the knowledge item 345, the manager module 605 can be configured to end or go to sleep.

Figure 9:
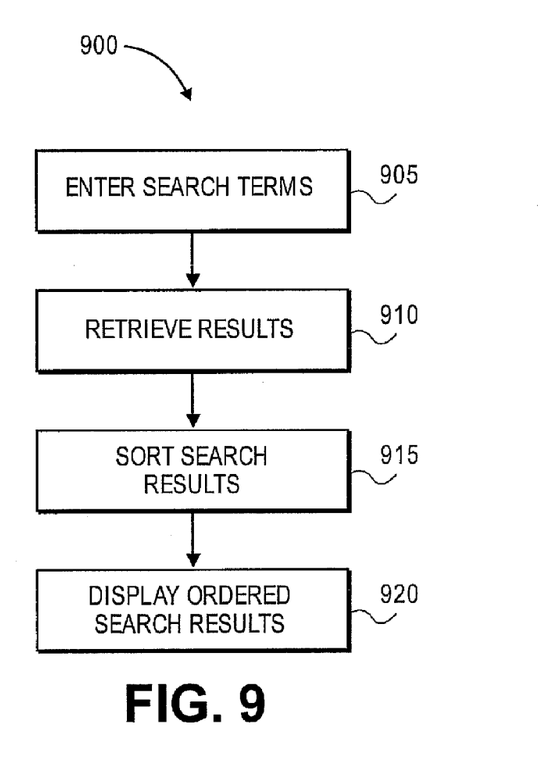
FIG. 9 depicts yet another exemplary flow diagram implemented by the forum module in accordance with yet another embodiment.

FIG. 9 illustrates a flow diagram 900 implemented by the forum module 340 in accordance with yet another embodiment. It should be readily apparent to those of ordinary skill in the art that the flow diagram 900 depicted in FIG. 9 represents a generalized schematic illustration and that other steps may be added or existing steps may be removed or modified.

As shown in FIG. 9, in step 905, a user can enter search terms in a GUI generated by a service portal 105 to search for items in the structured forum of the knowledge server 110. The user can enter random terms and/or use terms from a set of community of tag terms to search for information items from the knowledge server 110 in the selected GUI.

The controller module 210 of the service portal 105 can be configured to format a request packet to the knowledge server 110, which is passed to the broker module 210 through the server interface 335 and the broker module 315 of the knowledge server 110.

The broker module 315 of the knowledge server 110 can be configured to pass the request packet to the business logic module 320 to formulate a query for the database 330 through the database interface module 325, in step 910. More particularly, the query searches the knowledgebase 345 and the certified knowledgebase 350. In some embodiments, the knowledge server 110 can be configured third party web sites with the selected tag terms. The third party web site results can be grouped and ranked with the results from the knowledgebase 345 and the certified knowledgebase 350, where the results from the certified knowledgebase 350 are prominently displayed by ranking, in step 915.

In step 920, the broker module 315 of the knowledge server 110 can forward the search results in a ranked fashion. More particularly, the results are passed onto the service portal 105 where the results are displayed by another GUI generated by the controller module 210 of the service portal 105.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   providing, by a server, a structured forum comprising:
      a rating module configured to receive a user rating associated with a knowledge item, and
      a database interface module configured to access:
         a certified knowledgebase comprising a first set of knowledge items having a user rating greater than a predetermined threshold, and
         general knowledgebase comprising a second set of knowledge items having a user rating less than the predetermined threshold;
   comparing a user rating associated with a selected knowledge item in the second set of knowledge items in the general knowledgebase with the predetermined threshold and moving the selected knowledge item to the first set of knowledge items in the certified knowledgebase if the user rating exceeds the predetermined threshold or maintaining the selected knowledge item in the second set of knowledge items in the general knowledgebase if the user rating is less than the predetermined threshold;
   receiving, by the structured forum, a set of community tag terms for association with one or more knowledge items;
   receiving, by the structured forum, a query comprising a tag term selected by a user from the set of community tag terms;
   searching at least one of the certified knowledgebase or the general knowledgebase for one or more matching knowledge items associated with the query; and
   providing an ordered list of the one or more matching knowledge items identified by the search, wherein the ordered list is arranged based on the user rating associated with the one or more matching knowledge items.

2. The method of claim 1, further comprising:
   searching the general knowledgebase based on the query, wherein the general knowledgebase comprises one or more unverified answers; and
   providing a list of one or more unverified answers identified in the search of the general knowledgebase.

3. The method of claim 2, further comprising
   providing the ordered list of the matching knowledge items and the list of the one or more unverified answers as a single result list, wherein the single result list arranges the matching knowledge items and the one or more unverified answers based on the user rating of each of the matching knowledge items and an associated user rating of each of the one or more unverified answers.

4. The method of claim 1, further comprising
   compiling a list of combined knowledge items from the certified knowledgebase and the general knowledgebase based on the tag term.

5. The method of claim 4, further comprising
   ordering the list of combined knowledge items based on an associated answer rating of each answer of the list of combined knowledge items.

6. An apparatus comprising:
   a memory device;
   a processor coupled to the memory device, the processor configured to provide a structured forum comprising:
      a rating module, executable by the processor, the rating module configured to receive a user rating associated with a knowledge item,
      a database interface module, executable by the processor, the database interface module configured to access:
         a certified knowledgebase comprising a first set of knowledge items having a user rating greater than a predetermined threshold, and
         a general knowledgebase comprising a second set of knowledge items having a user rating less than the predetermined threshold; and
      a forum module executable by the processor, the forum module configured to:
         compare a user rating associated with a selected knowledge item in the second set of knowledge items in the general knowledgebase with the predetermined threshold and moving the selected knowledge item to the first set of knowledge items in the certified knowledgebase if the user rating exceeds the predetermined threshold or maintaining the selected knowledge item in the second set of knowledge items in the general knowledgebase if the user rating is less than the predetermined threshold,
         receive a set of community tag terms for association with one or more knowledge items,
         process a query comprising a tag term selected by a user from the set of community tag terms,
         execute a search in at least one of the certified knowledgebase or the general knowledgebase for one or more matching knowledge items based on the query, and
         provide an ordered list of the one or more matching knowledge items identified by the search, wherein the ordered list is arranged based on the user rating associated with the one or more matching knowledge items.

7. The apparatus of claim 6, wherein the forum module is further configured to:
   search the general knowledgebase based on the query, wherein the general knowledgebase comprises one or more unverified answers; and
   provide a list of one or more unverified answers identified in the search of the general knowledgebase.

8. The apparatus of claim 7, wherein the forum module is further configured to provide the ordered list of the matching knowledge items and the list of the one or more unverified answers as a single result list, wherein the single result list arranges the matching knowledge items and the one or more unverified answers based on the user rating of each of the matching knowledge items and an associated user rating of each of the one or more unverified answers.

9. The apparatus of claim 6, wherein the forum module is configured to compile a list of combined knowledge items from the certified knowledgebase and the general knowledgebase based on the tag term.

10. The apparatus of method of claim 9, wherein the forum module is further configured to order the list of combined knowledge items based on an associated rating of each answer of the list of combined knowledge items.

11. A system for searching, the system comprising:
a service portal configured to provide a single access point for a plurality of users;
a knowledge server configured to couple with the service portal, wherein the knowledge server is configured to provide a structured forum comprising:
  a rating module configured to receive a user rating associated with a knowledge item, and
  a database interface module configured to access:
    a certified knowledgebase comprising a first set of knowledge items having a user rating greater than a predetermined threshold, and
    a general knowledgebase comprising a second set of knowledge items having a user rating less than the predetermined threshold;
a forum module executing on a processor configured to be executed on the knowledge server, wherein the forum module is configured to
  compare a user rating associated with a selected knowledge item in the second set of knowledge items in the general knowledgebase with the predetermined threshold and moving the selected knowledge item to the first set of knowledge items in the certified knowledgebase if the user rating exceeds the predetermined threshold or maintaining the selected knowledge item in the second set of knowledge items in the general knowledgebase if the user rating is less than the predetermined threshold,
  receive a set of community tag terms for association with one or more knowledge items process a query comprising a tag term selected by a user from the set of community tag terms,
  execute a search in at least one of the certified knowledgebase or the general knowledgebase for one or more matching knowledge items based on the query, and
  provide an ordered list of the one or more matching knowledge items identified by the search, wherein the ordered list is arranged based on the user rating associated with the one or more matching knowledge items.

12. The system of claim 11, wherein the forum module is further configured to:
search the general knowledgebase based on the query, wherein the general knowledgebase comprises one or more unverified answers; and
provide a list of one or more unverified answers identified in the search of the general knowledgebase.

13. The system of claim 12, wherein the forum module is further configured to:
provide the ordered list of the matching knowledge items and the list of the one or more unverified answers as a single result list, wherein the single result list arranges the matching knowledge items and the one or more unverified answers based on the user rating of each of the matching knowledge items and an associated rating of each of the one or more unverified answers.

14. The system of claim 11, wherein the forum module is configured to compile a list of combined knowledge items from the certified knowledgebase and the general knowledgebase based on the tag term.

15. The system of claim 14, wherein the forum module is further configured to order the list of combined knowledge items based on an associated rating of each answer of the list of combined knowledge items.

* * * * *